United States Patent [19]

Naffa

[11] 4,344,726
[45] Aug. 17, 1982

[54] CARGO HANDLING APPARATUS

[75] Inventor: Faisal A. Naffa, Huntington Beach, Calif.

[73] Assignee: Brooks & Perkins, Incorporated, Southfield, Mich.

[21] Appl. No.: 26,426

[22] Filed: Apr. 2, 1979

[51] Int. Cl.³ .............................................. B60P 7/00
[52] U.S. Cl. ...................................... 410/79; 410/95; 414/537; 104/250; 414/501
[58] Field of Search .............................. 414/529–532, 414/536–538, 501; 244/137 R; 104/250; 410/79, 89–95, 91–93; 105/287, 311 R; 193/35 F; 14/56, 64

[56] References Cited

U.S. PATENT DOCUMENTS

| | | | |
|---|---|---|---|
| 1,107,896 | 8/1914 | Caswell | 105/287 |
| 2,523,723 | 9/1950 | Santeu et al. | 414/537 |
| 3,203,527 | 8/1965 | Daetwyler | 414/532 X |
| 3,335,983 | 8/1967 | Mollon et al. | 104/250 X |
| 3,377,040 | 12/1966 | Hansen | 410/79 |
| 3,800,713 | 4/1974 | Nordstrom | 410/79 |
| 4,076,134 | 2/1978 | Landow | 414/333 |
| 4,165,810 | 8/1979 | Young | 414/537 X |

Primary Examiner—Trygve M. Blix
Assistant Examiner—L. E. Williams
Attorney, Agent, or Firm—Whittemore, Hulbert & Belknap

[57] ABSTRACT

Cargo loading and unloading systems, particularly for military aircraft such as helicopters, including right and lefthand restraint rail assemblies having longitudinally spaced lock mechanisms which are adapted to provide lateral and forward and aft restraint of load-supporting pallets. Operating controls for each lock to enable the locks to be closed individually, and further include control rod assemblies to permit all such lock mechanisms to be closed simultaneously or to be opened either sequentially or simultaneously. Other lock mechanisms are operable to secure non-palletized types of cargo and are closed and opened sequentially by one of the control rod assemblies. A ramp structure is also provided, including guide structure for proper guidance of the pallets as they are loaded into or unloaded from the aircraft, and pallet supporting rollers facilitating the loading and unloading of vehicles.

26 Claims, 45 Drawing Figures

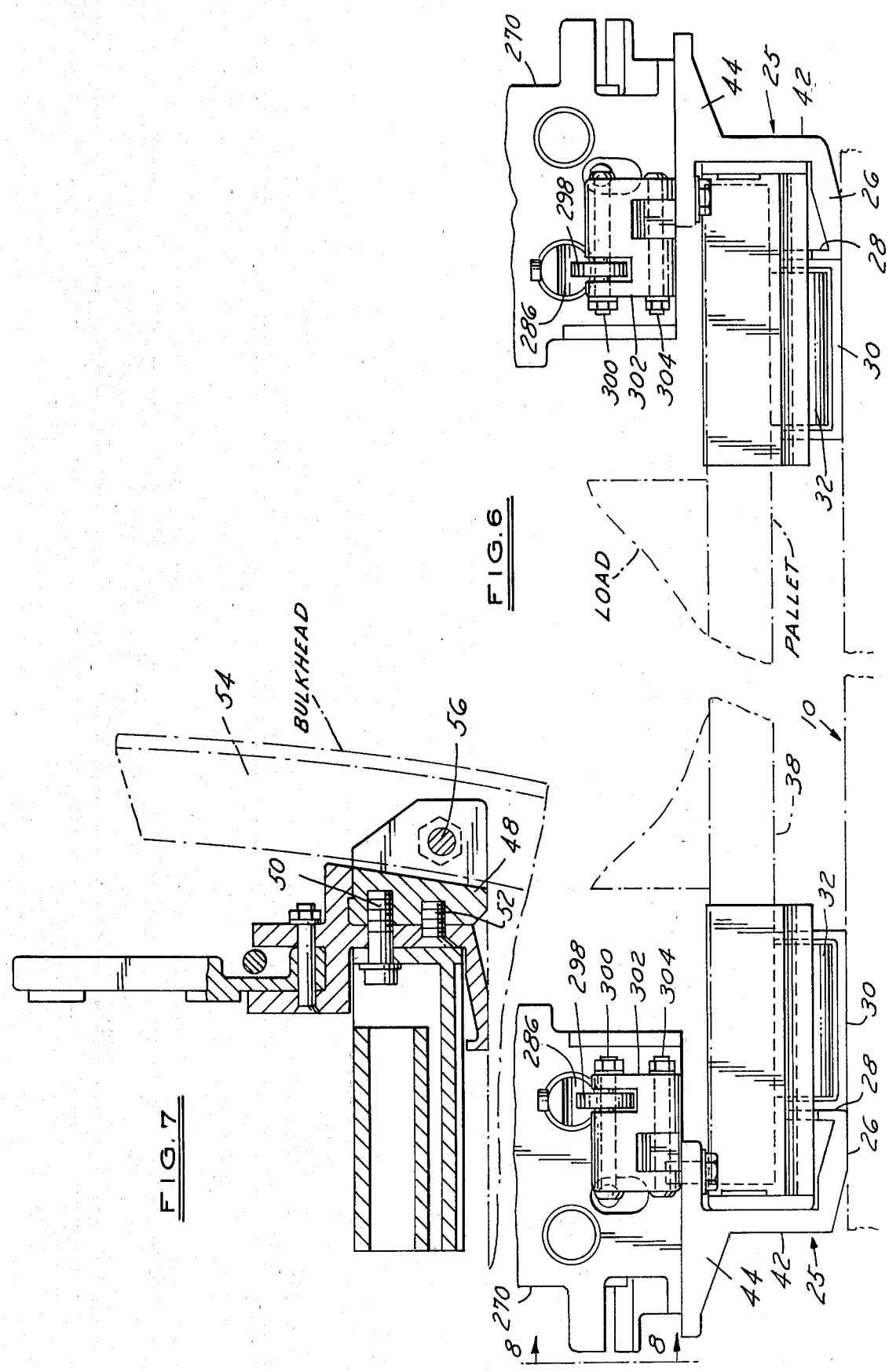

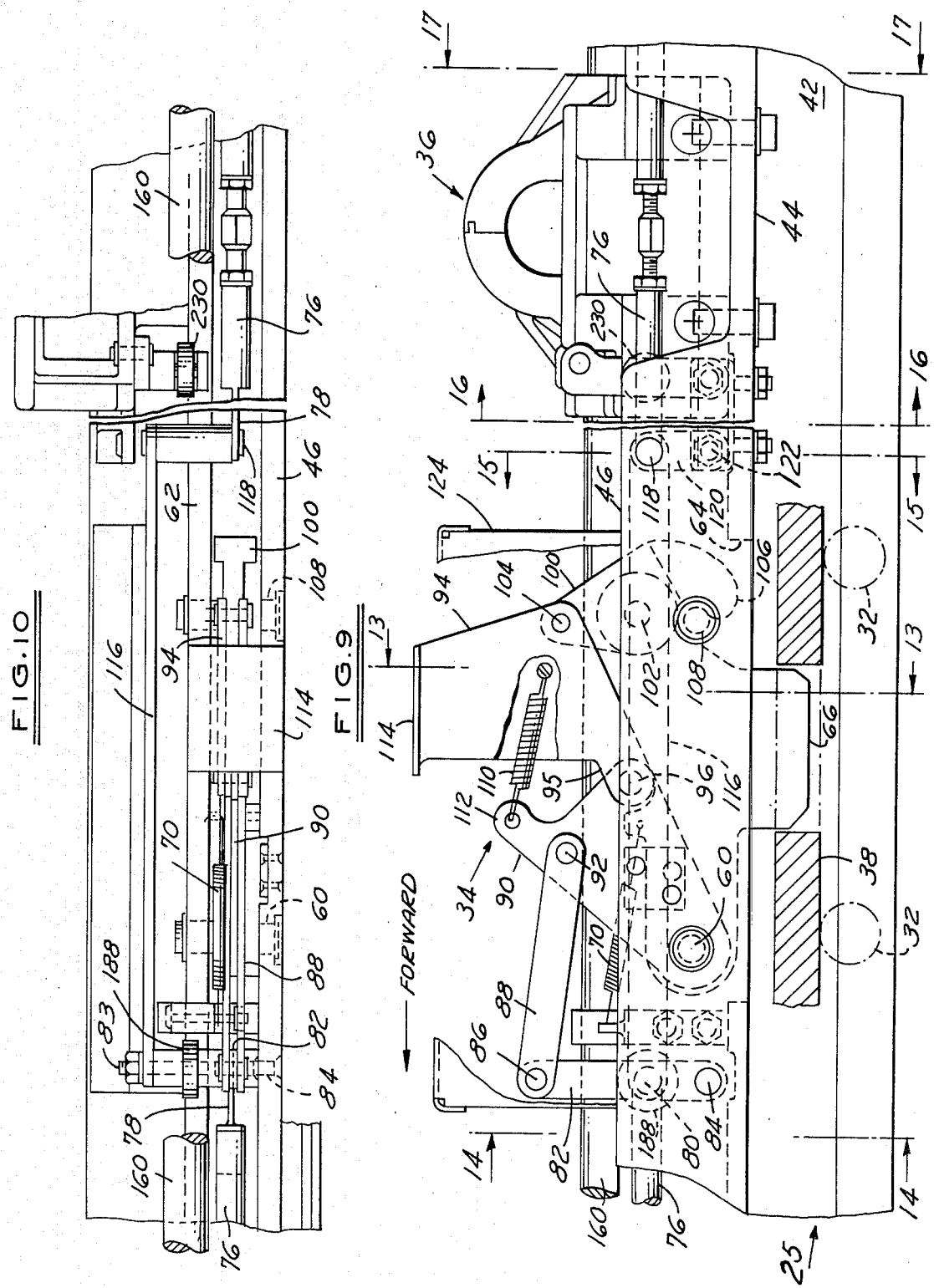

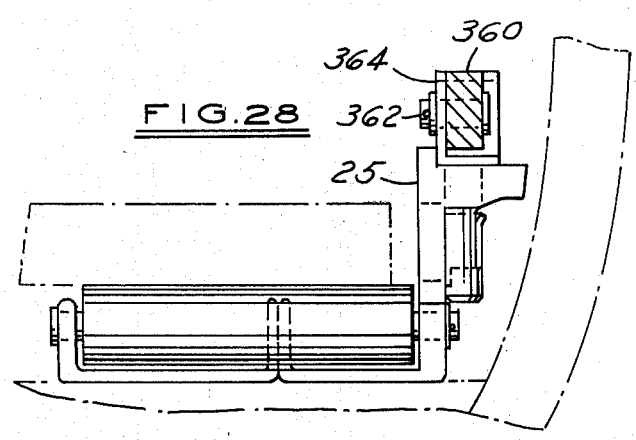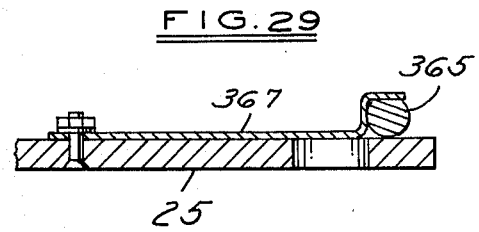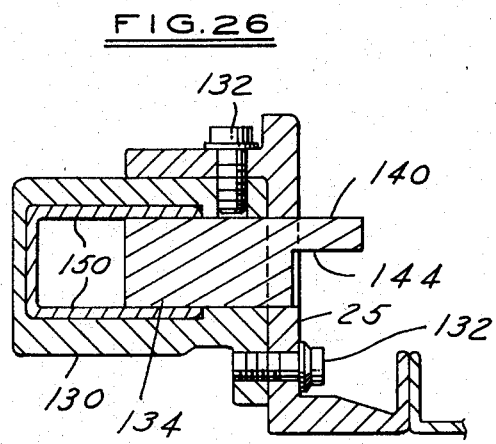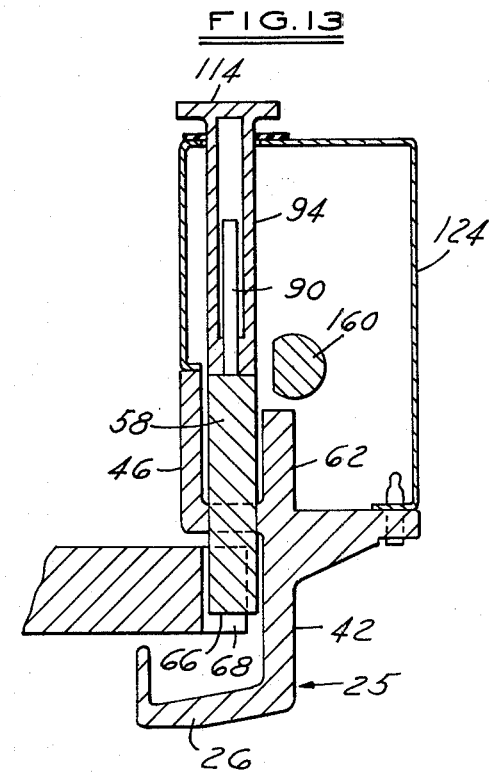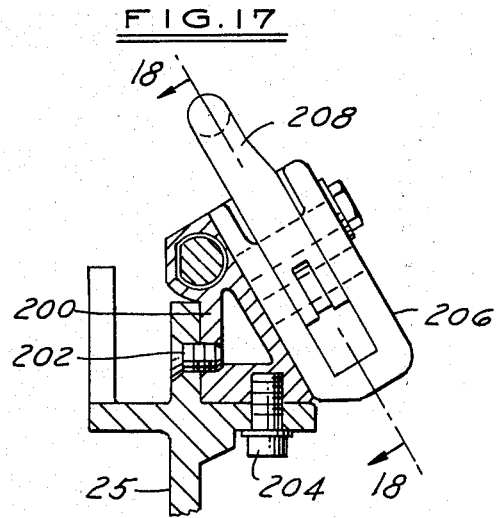

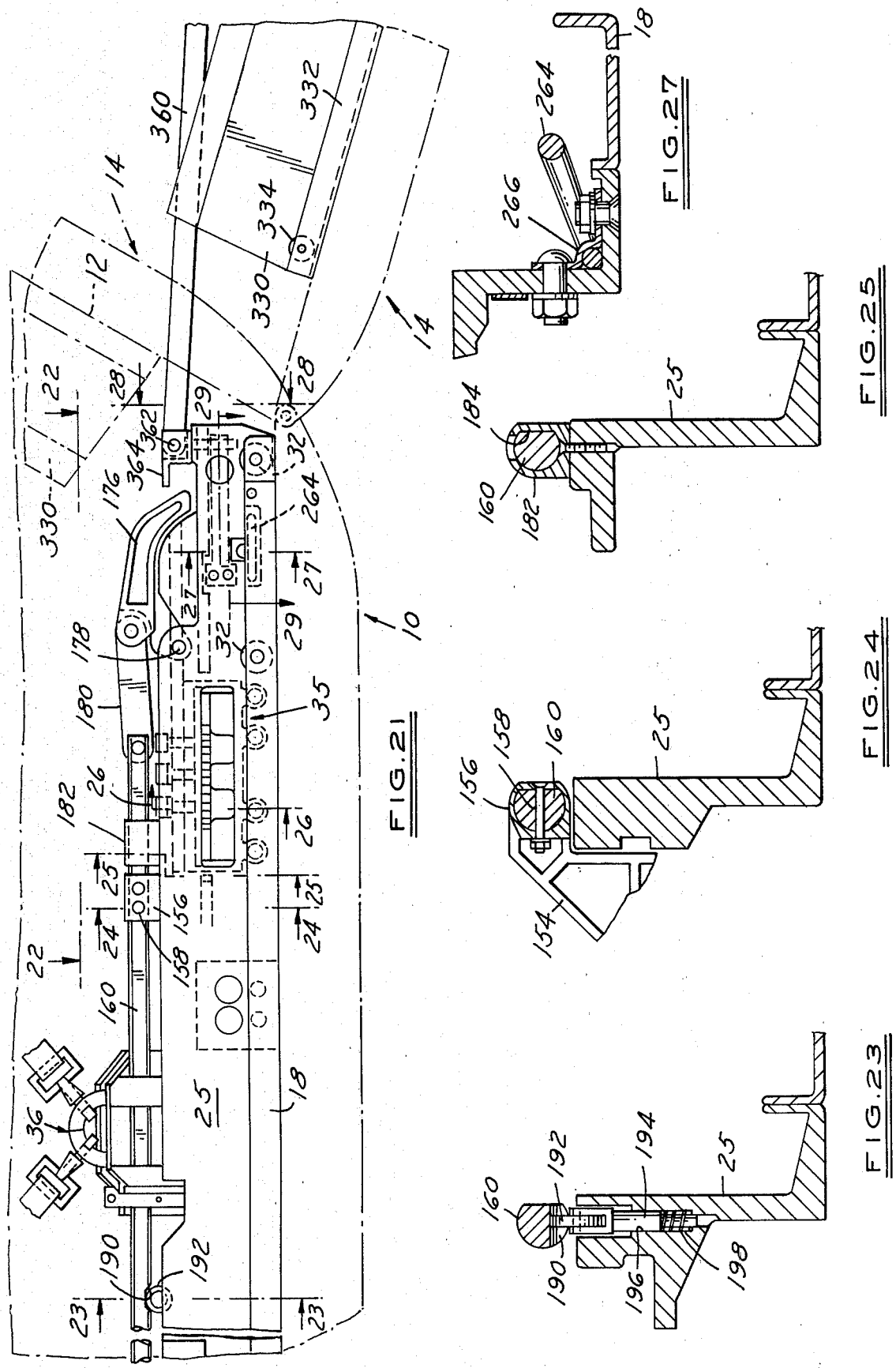

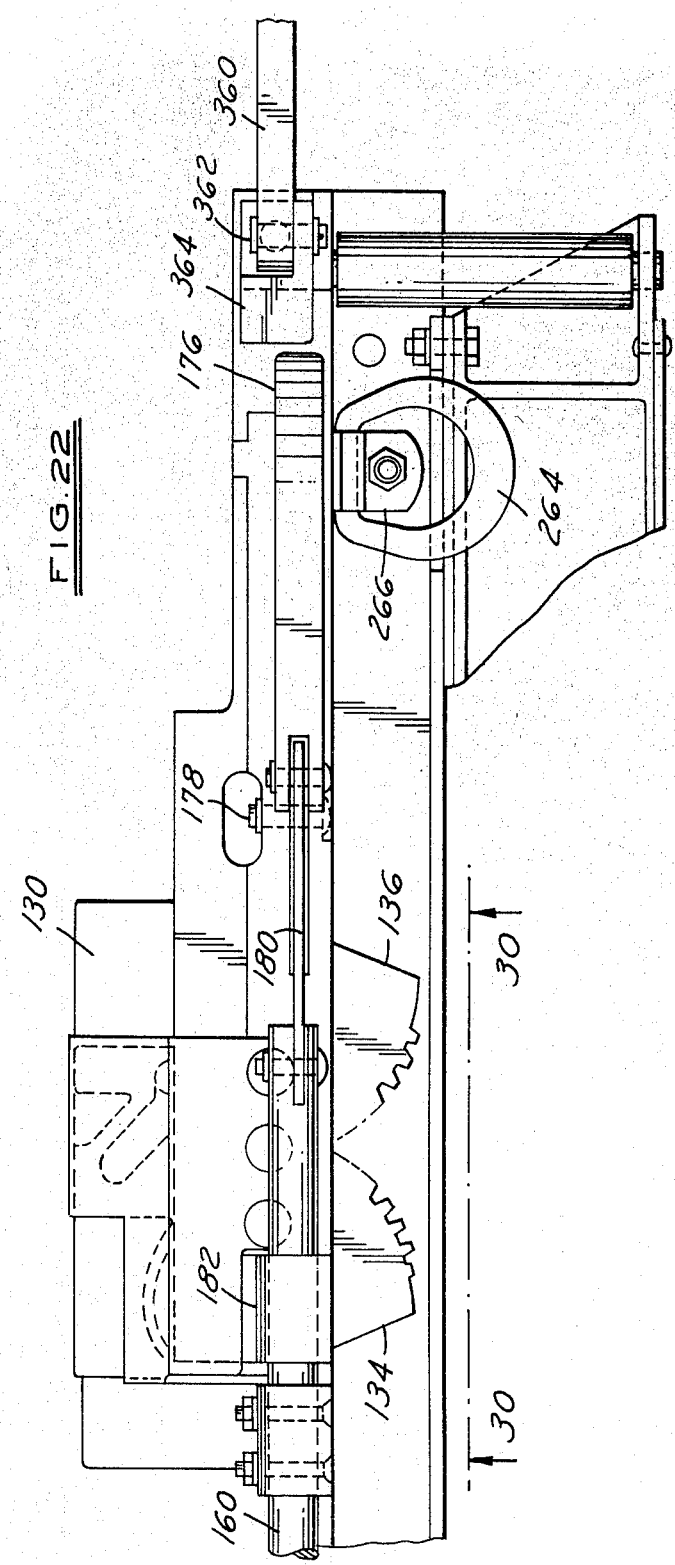

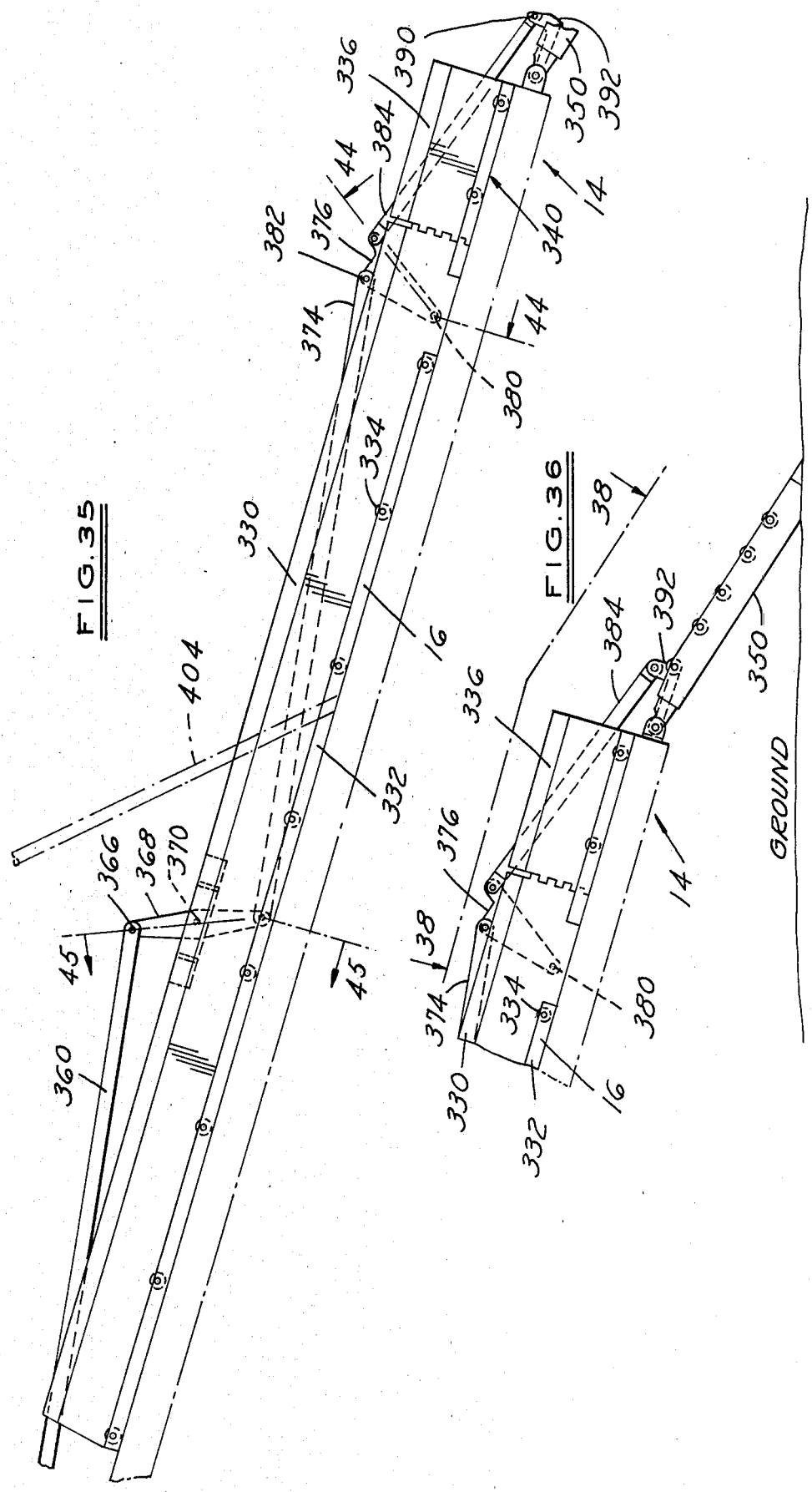

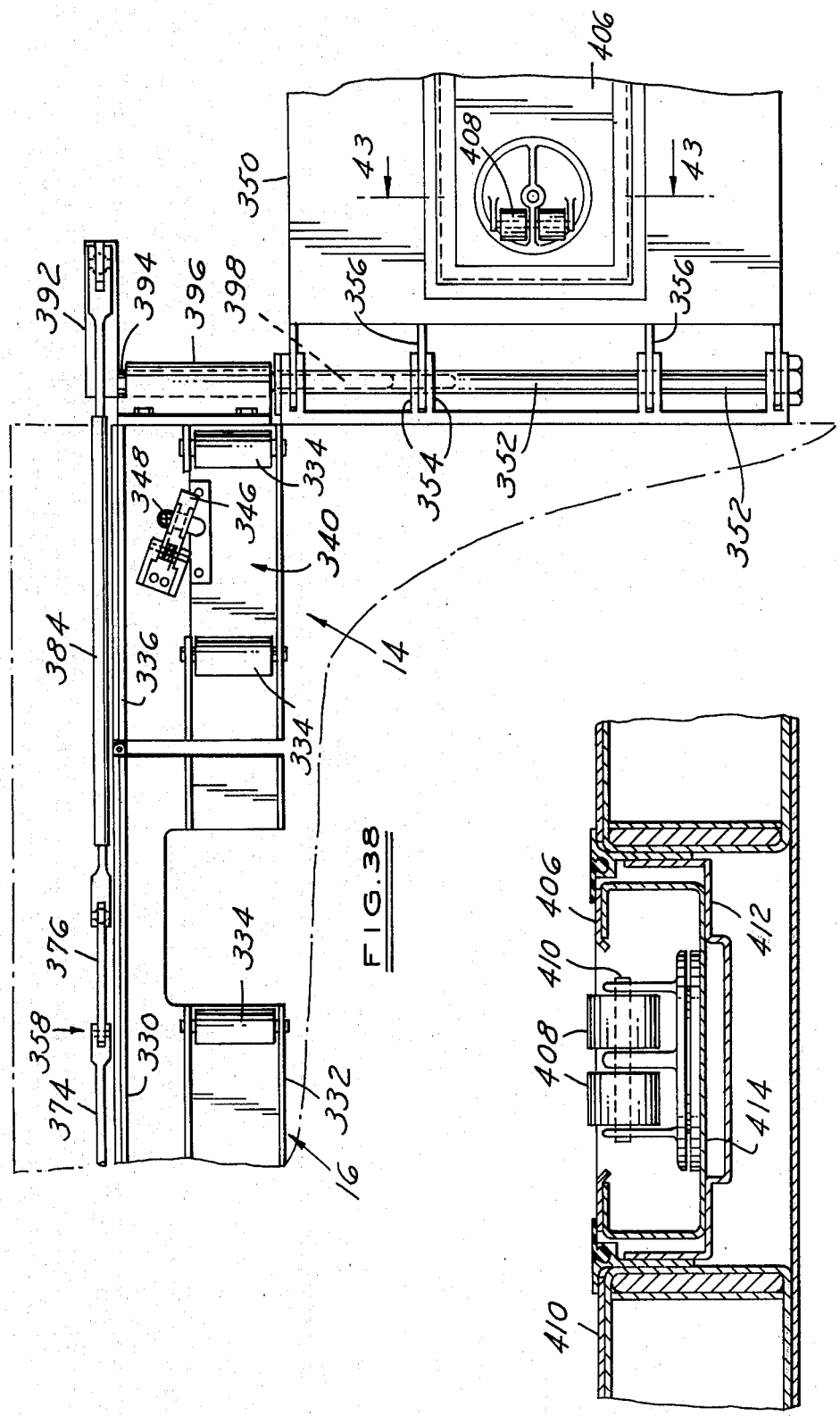

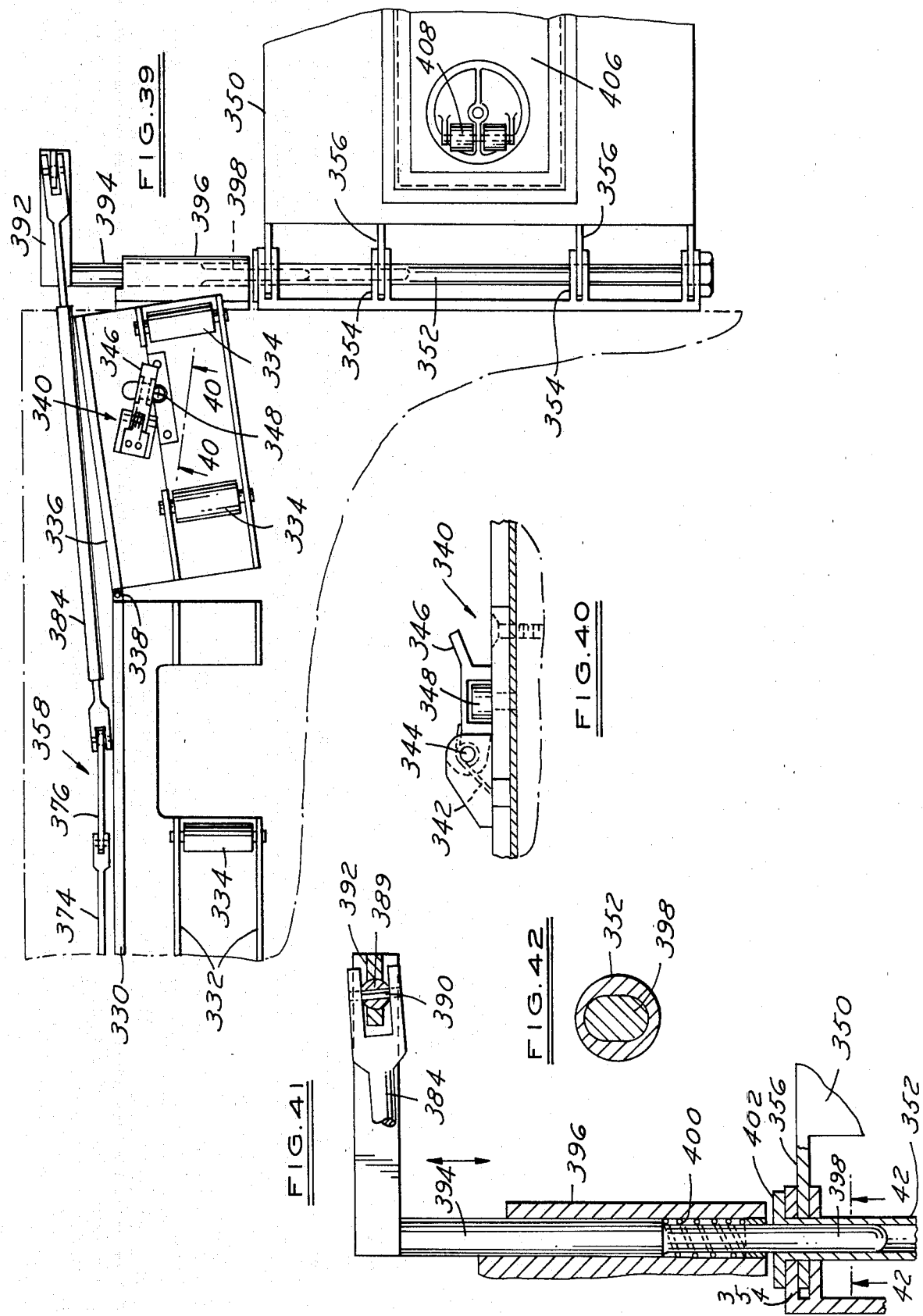

CARGO HANDLING APPARATUS

BACKGROUND OF THE INVENTION

The present invention has arisen from the need to provide safe, reliable and easily operated mechanisms for the loading and unloading of a variety of cargo into and out of an aircraft such as a military helicopter; to provide adequate lateral, vertical and fore and aft restraint of the cargo within the aircraft, and to provide control means which permit selective operation of the restraint mechanisms in a variety of modes as conditions may require. The present cargo handling system is specifically designed for use in the CH-53 military helicopter, but it will be apparent that the system may be used in other aircraft as well. U.S. Pat. No. 3,335,983 discloses a cargo loading system of the general type disclosed herein and is the principal prior art known.

SUMMARY OF THE INVENTION

Cargo loading system for aircraft including left and right-handed restraint rail assemblies, each having a series of lock mechanisms for restraint of load-supporting pallets and a series of tie-down latch mechanisms for securing non-palletized cargo within the aircraft. Operating control means provide selective actuation of the lock and latch mechanisms to engaged and disengaged positions in a number of modes to suit operating conditions. The lock mechanisms each may be moved to locked position by a foot-pedal operated means, with such means being interrelated in such manner that the locking of any one of the lock mechanisms automatically locks all other forward thereof which are not already locked, and further is arranged so that no lock mechanism can be locked unless all others forward thereof are in locked condition. The control means includes a sequential operating rod for each rail assembly extending substantially the length thereof and operable in one mode to close all of the lock mechanisms simultaneously and to close all of the latch mechanisms sequentially from fore to aft. This operating rod is operable in another mode to open all of the lock and latch mechanisms sequentially from aft to fore. A simultaneous operating rod for each rail assembly is operable to open all of the lock and latch mechanisms simultaneously. A ramp structure pivoted on a horizontal axis at the aft end of the rail assemblies to permit cargo to be loaded into and unloaded from the aircraft has guide means at its aft end to insure proper alignment of the pallets with the restraint mechanisms as the pallets are being loaded into the aircraft. The ramp is also provided with pivoted flippers at its aft end to facilitate the loading and unloading of vehicles and control linkages on the ramp automatically position the flippers as the ramp is raised and lowered.

IN THE DRAWINGS

FIG. 6 is an end elevational view taken on line 6—6 of FIG. 4.

FIG. 7 is a sectional view taken on line 7—7 of FIG. 4.

FIG. 9 is an enlarged side elevation of a portion of a rail assembly.

FIG. 10 is a top plan view of the mechanism of FIG. 9.

FIG. 13 is a sectional view taken on line 13—13 of FIG. 9.

FIG. 17 is a sectional view taken on line 17—17 of FIG. 9.

FIG. 21 is a side elevation showing aft end of a rail assembly and its associated locking mechanism.

FIG. 22 is a plan view taken on line 22—22 of FIG. 21.

FIGS. 23, 24, 25, 26, 27, 28 and 29 are sectional views respectively taken on the correspondingly numbered section lines of FIG. 21.

FIG. 35 is a side elevational view of the ramp mechanism in its lowered position.

FIG. 36 is a side elevation of the aft end of the ramp mechanism shown in FIG. 35.

FIG. 38 is a top plan view taken on line 38—38 of FIG. 36.

FIG. 39 is a view similar to FIG. 38 illustrating a feature of the ramp mechanism.

FIG. 40 is a sectional view taken on line 40—40 of FIG. 39.

FIG. 41 is an enlarged sectional view of a portion of the mechanism shown in FIG. 39.

FIG. 42 is a sectional view taken on line 42—42 of FIG. 41.

FIG. 43 is a sectional view taken on line 43—43 of FIG. 38.

Figure 1:
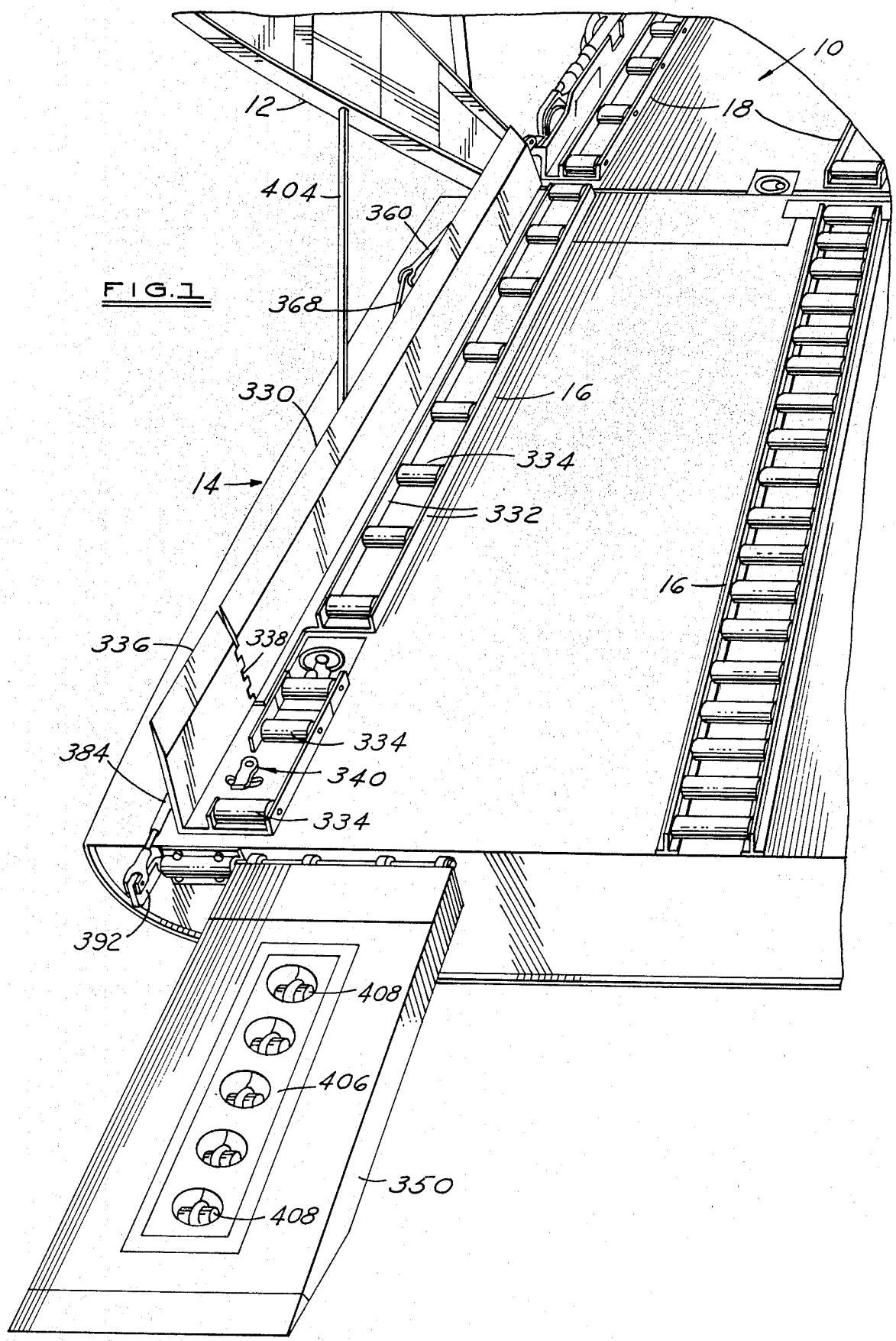
FIG. 1 is a perspective view of the aft end of a cargo aircraft equipped with the cargo handling system of this invention.
Figure 2:
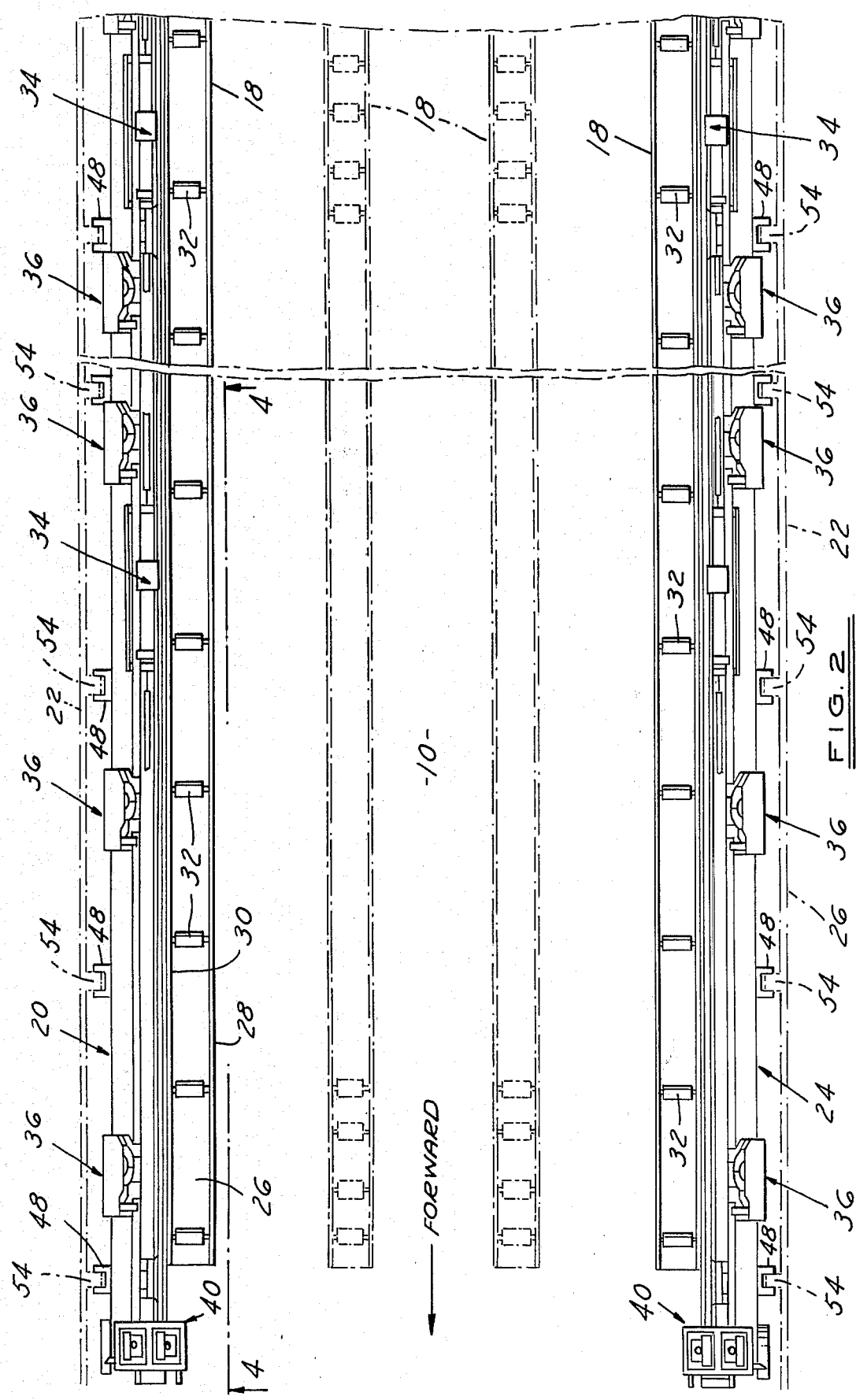
FIG. 2 is a fragmentary plan view of the forward end of the apparatus installed in an aircraft.
Figure 3:
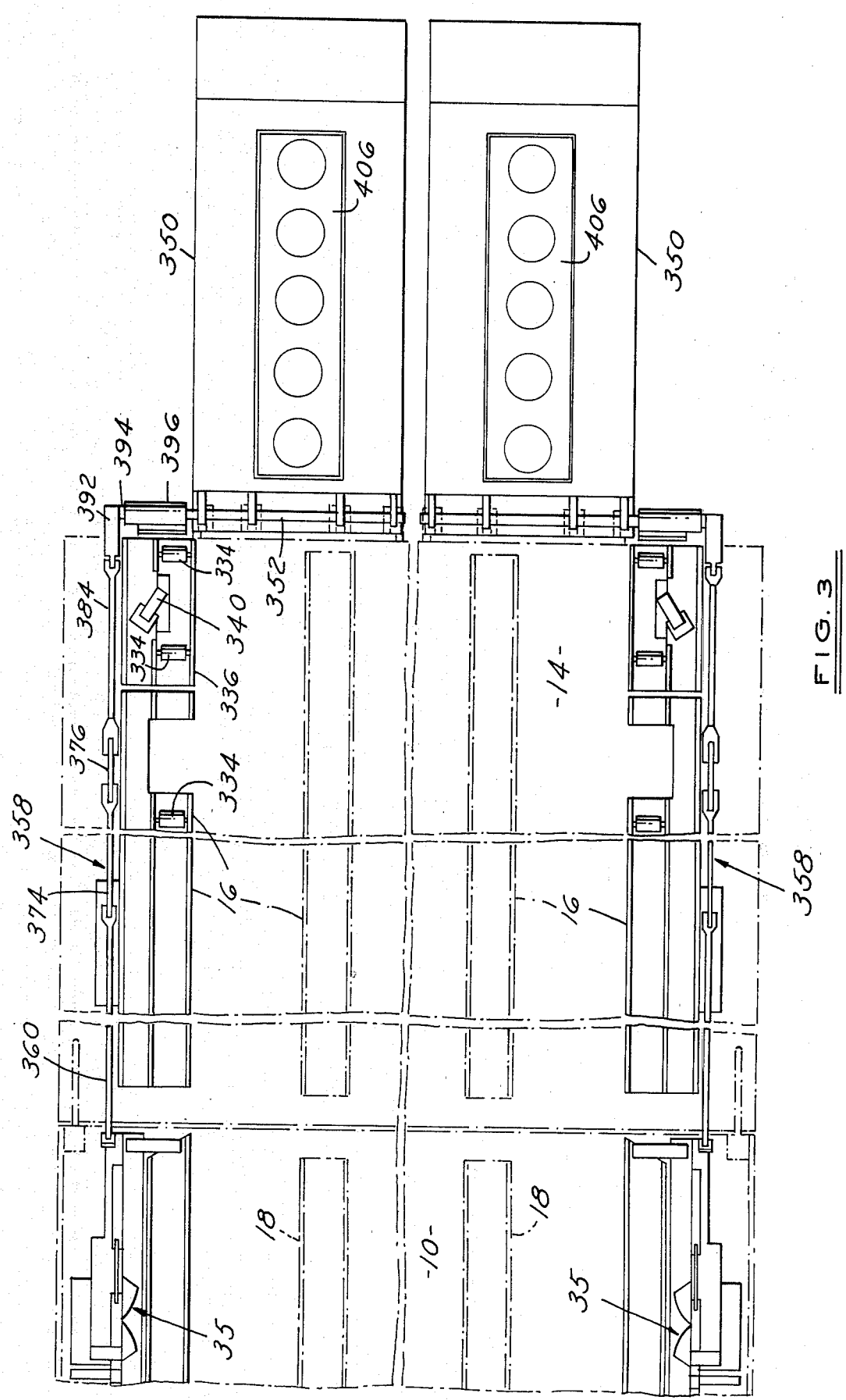
FIG. 3 is a fragmentary plan view of the aft end of the apparatus.
Figure 4:
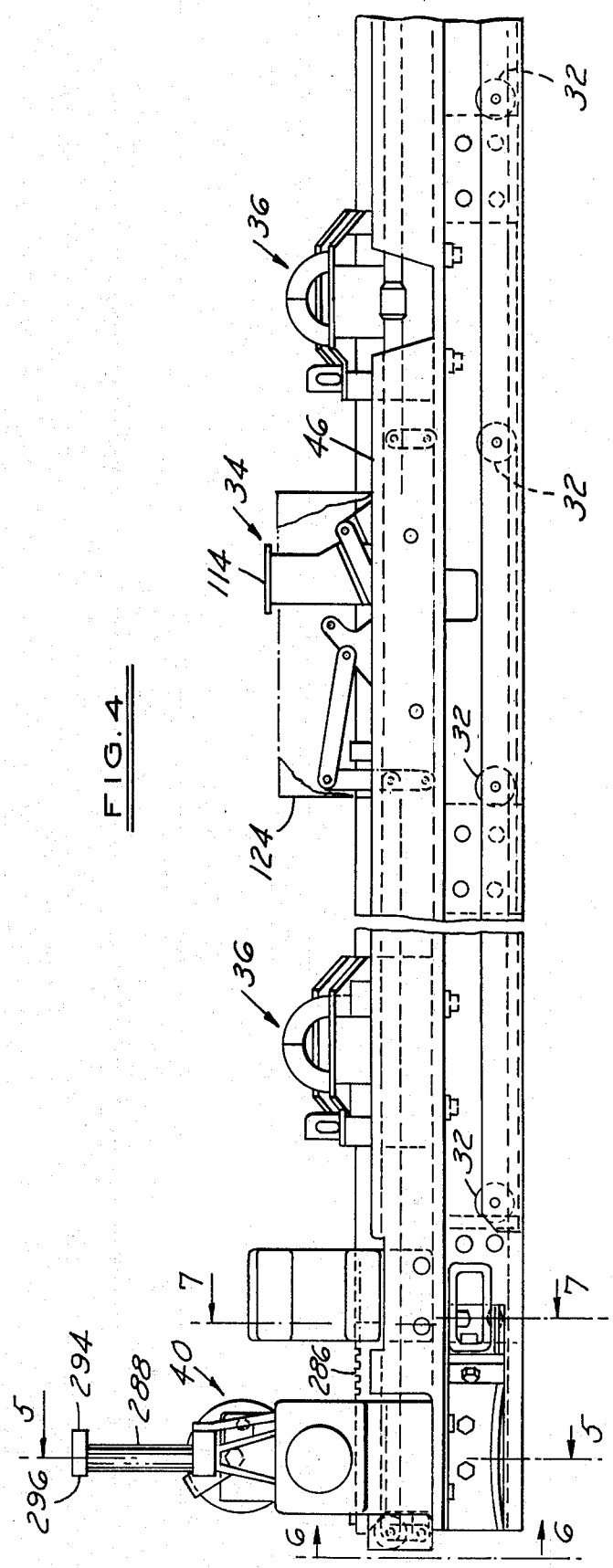
FIG. 4 is a side elevation taken on line 4—4 of FIG. 2.
Figure 16:
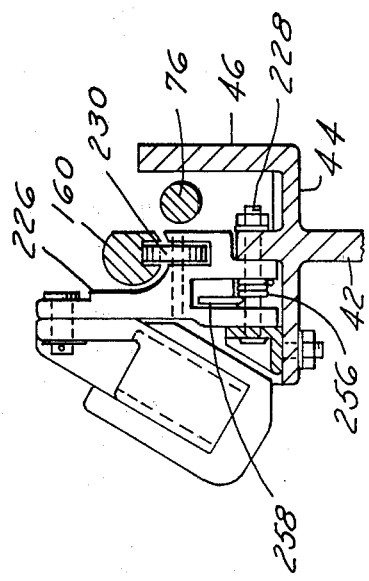
FIG. 16 is a sectional view taken on line 16—16 of FIG. 9.
Figure 5:
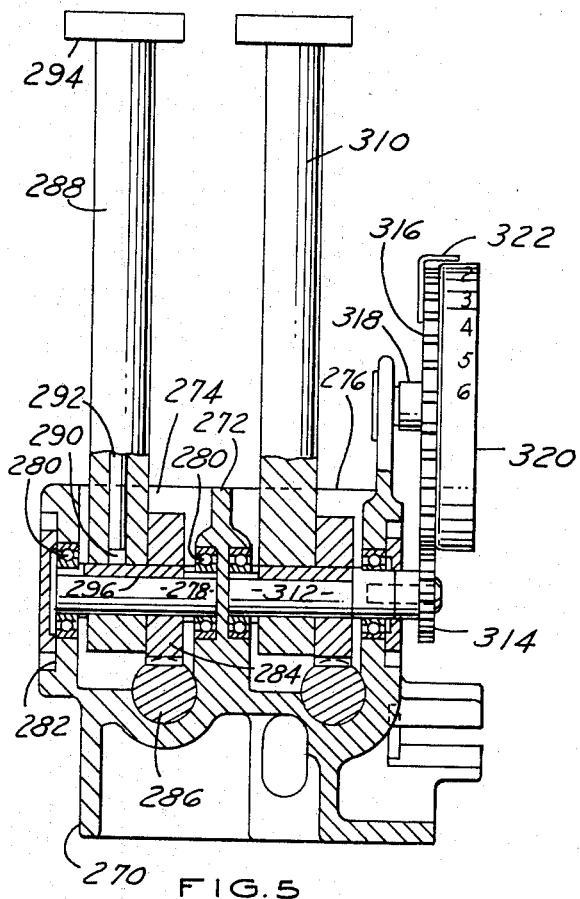
FIG. 5 is a sectional view taken on line 5—5 of FIG. 4.

Referring to FIGS. 1, 2 and 3, a cargo type aircraft has a floor 10 extending toward the forward end of the body of the door opening 12 is adapted to be closed by a pivoted ramp 14 in a conventional manner although the ramp 14 as illustrated has certain novel features provided by this invention. The ramp is provided with roller type conveyors 16 along which palletized cargo may be rolled during loading and unloading operations. The floor 10 is also provided with roller conveyors 18 for supporting the pallets.

A right-hand restraint rail assembly 20 is supported on the floor 10 in close proximity to the right side wall 22 of the aircraft. A left-hand restraint rail assembly 24 extends along the left side 26 of the cargo space and, since it is indentical to the rail assembly 20, only the right hand rail assembly 20 will be described in detail herein.

The rail assembly 20 includes a rail 25 having a horizontal portion 26 on the floor 10 and an upwardly extending flange 28. A roller conveyor 18 includes a channel-shaped rail member 30 which supports the rollers 32 on its vertical walls. The outermost conveyors 18 are rigidly secured to the rails 25 while the intermediate conveyors, if needed, are secured to the floor 10. The outer conveyors may be formed integrally with the rails 25 if desired.

The rail assembly 20 includes a series of pallet lock mechanisms 34 and series of tie-down latch mechanisms 36 located at spaced intervals along its length. The locks 34 are operable to secure pallets 38, which are supported on the conveyors 18, against lateral and fore and aft movement when the locks are in locked position. The pallet locks are all of the same construction except for the pallet lock 35 adjacent the aft end of the rail assembly 20. The rail assembly 20 further includes a control station 40 at its forward end.

The rail 25 has a vertical web portion 42, a horizonal flange portion 44 and a vertical wall 46 at the inner edge of the flange 44. The underside of the flange 44 overlies the edges of the pallets 38 to provide vertical restraint for the pallets. As shown in FIGS. 2 and 7, channel shaped mounting blocks 48 are secured to the web 42 of rail 25 by screws 50 and 52 at points along the length of the rail corresponding to the location of structural bulkheads 54 of the aircraft body. The blocks 48 are secured to the bulkheads 54 by bolts 56.

Referring to FIGS. 9 to 15, each lock mechanism 34 comprises a lock member 58 pivoted on a pin 60 extending between the wall 46 and an outer wall 62 extending upwardly from flange portion 44 of rail 25. The flange is cut out as at 64 to permit the dog 66 on lock member 58 to pivot to the locked position shown in FIGS. 9 and 13 in which the dog 66 engages in a recess 68 formed in the side edge of the pallet 38. A spring 70 secured to a lug 72 on lock member 58 and to a post 74 on rail 25 biases the lock member 58 to its unlocked position shown in FIG. 12. A control rod 76 which provides for simultaneous operation of the lock mechanism in a manner to be described has a flat end portion 78 apertured to receive a pin 80 secured to a lever 82 which is pivoted on the rail 25 by a pin 84. The upper end of lever 82 is pivotally connected by a pin 86 to one end of a link 88. A lever 90 pivoted on pin 60 is pivotally connected to the other end of link 88 by a pin 92. A foot-pedal 94, one at each lock station and individually operable by a crew member thereat has one end 95 pivotally connected to the lever 90 by a pin 96. The outer end 98 of lock member 58 carries a latch member 100 which is pivoted thereto on a pin 102. One end of latch member 100 is pivotally connected to pedal 94 by a pin 104. The other end of latch member 100 has a nose portion 106 which engages behind a latching pin 108 secured to rail 25. A spring 110 is connected to a lug 112 on lever 90 and to pedal 94. The pedal 94 has a top plate 114 which the operator may step on to move the lock mechanism from the unlocked position of FIG. 12 to the locked position of FIG. 9. The relationship of points 60, 96 and 104 provides an overcenter toggle linkage which positively locks the lock member 58 in locked position. When lever 82 is pivoted forwardly by rod 76 the portion 106 of latch member 100 will disengage pin 108 as the latch member pivots on pin 102 thereby allowing the lock mechanism to move to the unlocked position of FIG. 12.

Figure 14:
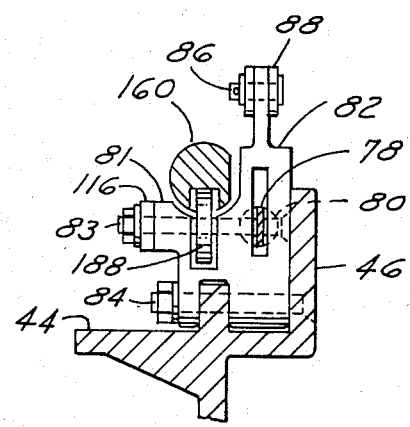
FIG. 14 is a sectional view taken on line 14—14 of FIG. 9.
Figure 11:
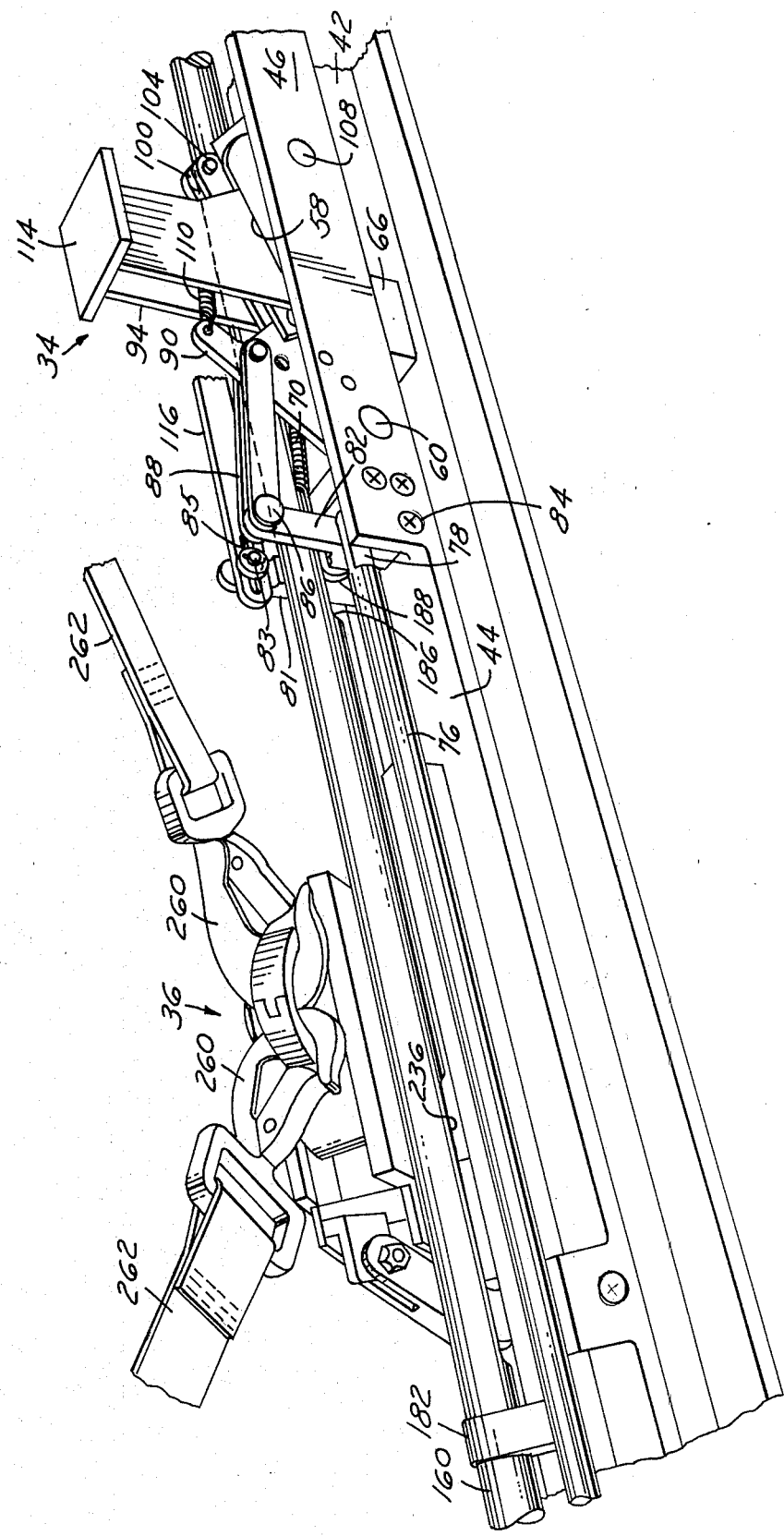
FIG. 11 is a perspective view illustrating the mechanism shown in FIGS. 9 and 10.
Figure 44:
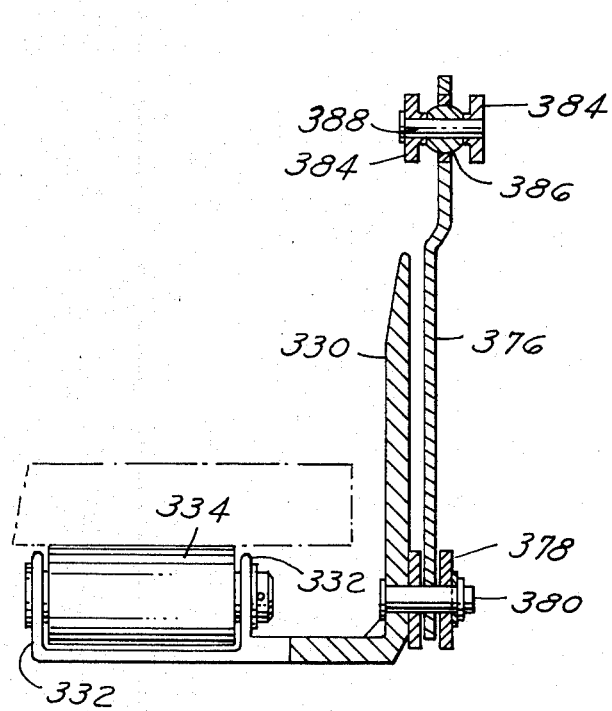
FIG. 44 is a sectional view taken on line 44—44 of FIG. 35.
Figure 45:
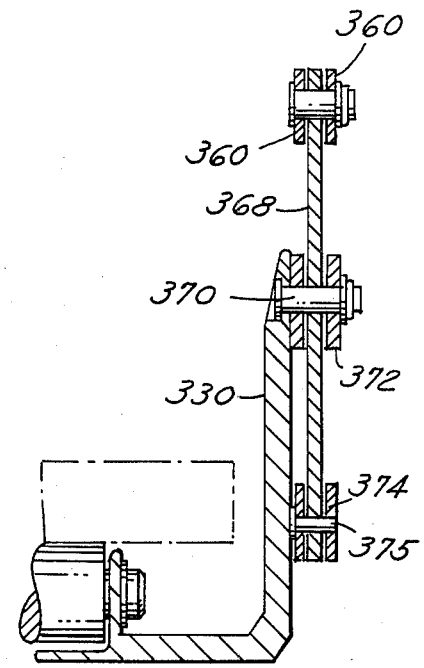
FIG. 45 is a sectional view taken on line 45—45 of FIG. 35.
Figure 12:
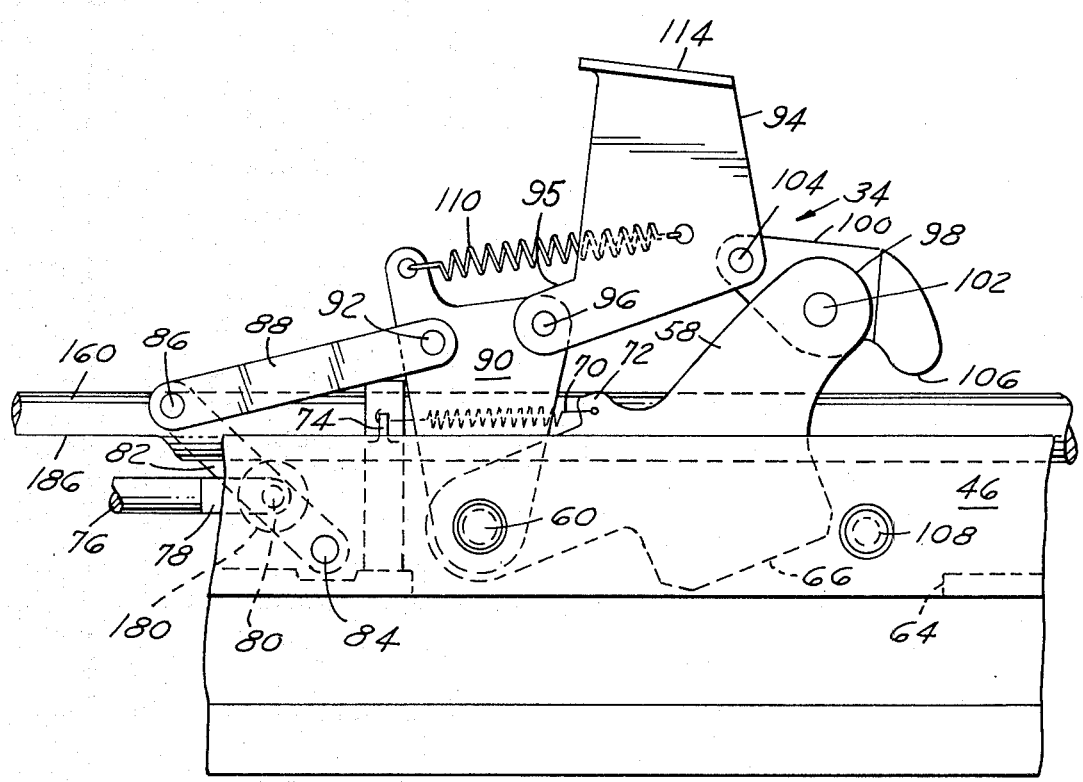
FIG. 12 is a side elevation showing one of the pedal operated locks of FIG. 9 in unlocked condition.
Figure 18:
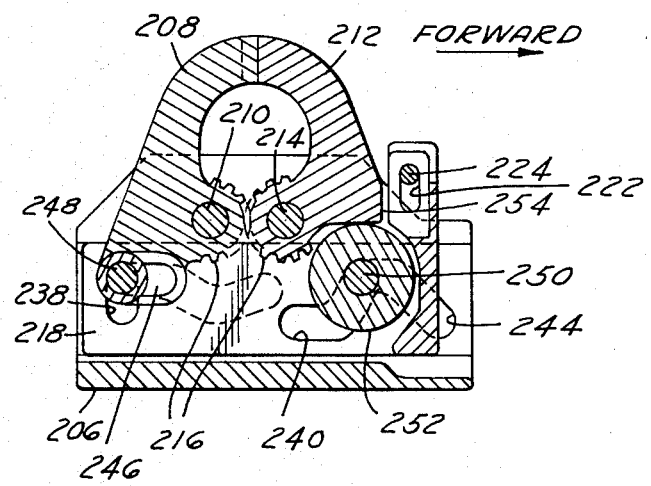
FIG. 18 is a sectional view taken on line 18—18 of FIG. 17.
Figure 19:
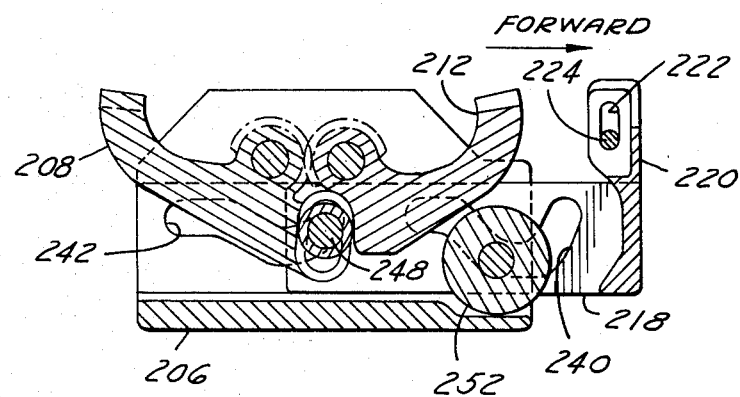
FIG. 19 is a sectional view similar to FIG. 18 showing the latch mechanism in open position.
Figure 20:
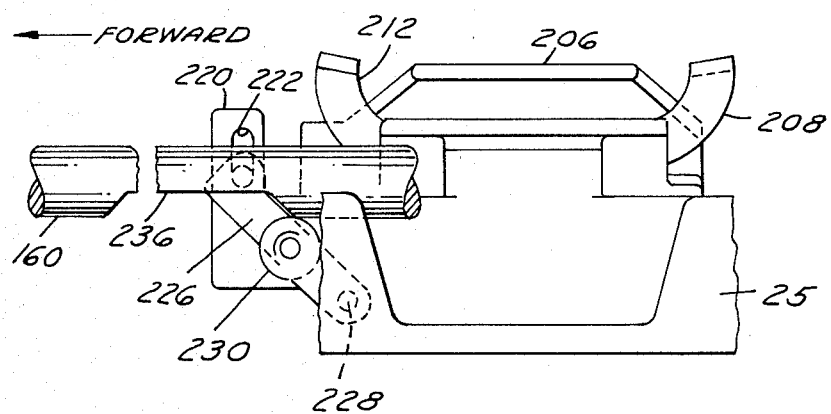
FIG. 20 is a side elevation of the mechanism of FIG. 19 in open position.
Figure 30:
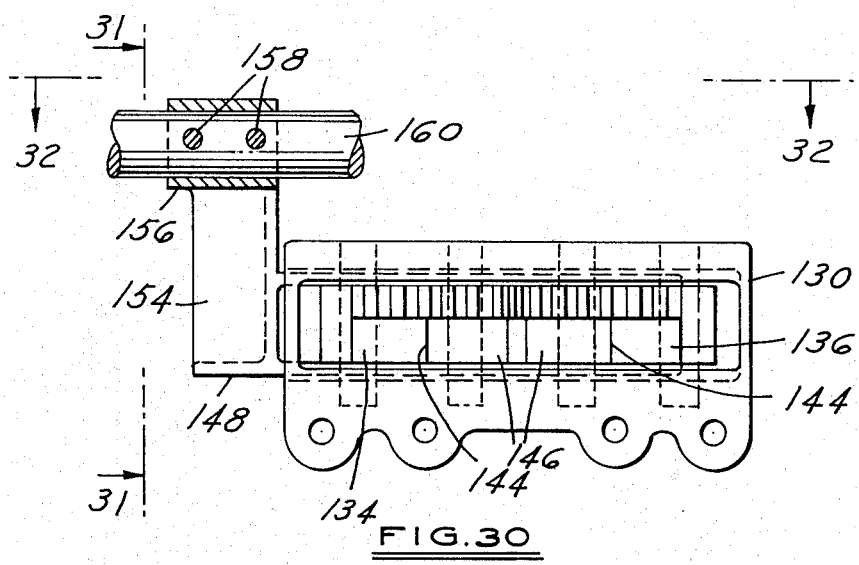
FIG. 30 is a side elevational view looking in the direction of the arrows 30—30 of FIG. 22.
Figure 31:
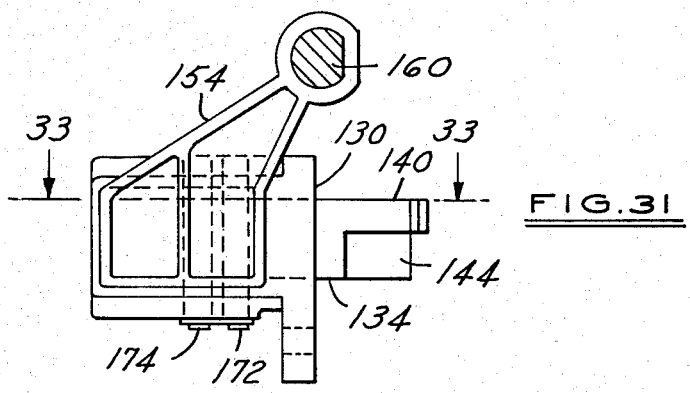
FIG. 31 is a sectional view taken on line 31—31 of FIG. 30.
Figure 32:
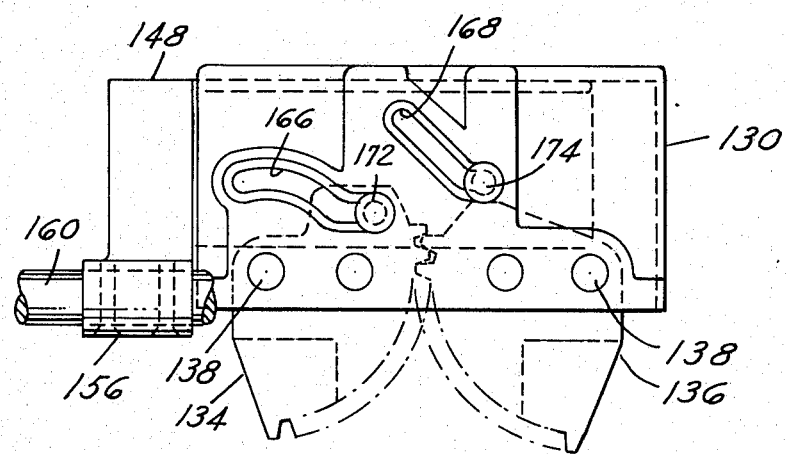
FIG. 32 is a plan view taken on line 32—32 of FIG. 30.
Figure 33:
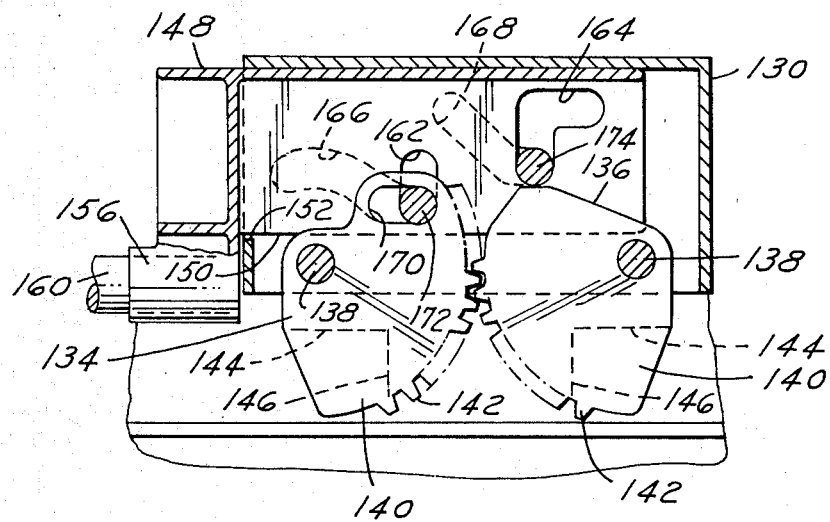
FIG. 33 is a sectional view taken on line 33—33 of FIG. 31.
Figure 34:
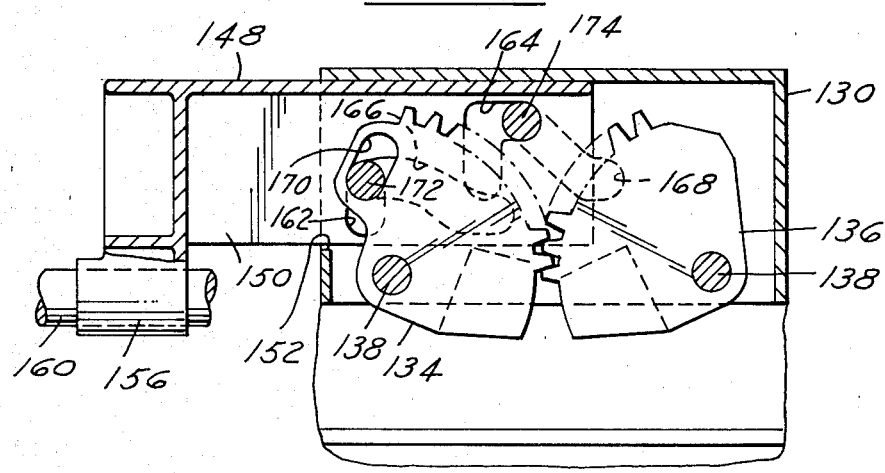
FIG. 34 is a view similar to FIG. 33 showing the locking mechanism in an open position.

As shown in FIG. 10, the simultaneous operating rod 76 is made in sections which, in the area of the lock mechanisms, are connected by laterally outwardly offset links 116 which are connected to the adjacent ends 78 of successive sections of rod 76. As shown in FIGS. 11 and 14, the lever 82 has an outer arm portion 81 carrying a pin 83 which extends through an elongated slot 85 in the forward end of link 116, thus providing a lost motion connection between successive sections of rod 76. The aft end of each link is pivotally connected by a pin 118 to a lever 120 pivoted at 122 to the rail 25. The forward end of the next rod section is also connected to the pin 118. When all locks are in the unlocked condition, the pin 83 at each station will be at the forward of its slot 85 and all sections of rod 76 will be in their forward position. If the pedal 94 at the forward station is depressed the lock member 58 connected thereto is pivoted to its locked position but since the pin 83 merely moves rearwardly through its slot 85 there is no corresponding movement of the link 116 at the first station and thus not actuation of any lock mechanism aft of the first station. When the lock at the second station is actuated through its foot-pedal the link 116 at such station remains stationery but the link 116 at the first station is pulled rearwardly until the forward end of its slot 85 engages pin 83. This sequence is repeated as successive locks are closed by their respective foot pedals. If the lock 34 at any station is not in locked condition and the pedal at the next aft station is depressed, the rearward pivoting of lever 82 at the aft station will pull all sections of rod 76 and links 116 forwardly thereof to the rear thereby closing all forward locks at the same time. When all locks 34 in locked condition, the pin 83 at each station will be at the forward end of its slot 85 in link 116 and if control rod 76 is then shifted forwardly from control station 40 in a manner to be described, all sections of rod 76 and all links 116 will be actuated simultaneously to open all locks 34. In order to prevent damage to the lock mechanisms a housing 124, shown in FIGS. 9 and 13, may enclose the latter with the foot pedal 94 projecting through an opening in the top of the housing 124.

The lock mechanisms 35 is illustrated in FIGS. 21, 22, 24, 25, 26, and 30 to 34. This lock includes a housing 130 bolted to the rail 25 by bolts 132 and a pair of lock elements 134 and 136 rotatably mounted in the housing 130 by pins 138. Each lock element 134 and 136 has an upper portion 140 having gear teeth 142 formed thereon. The lock elements are rotatable between a retracted or unlock position shown in FIG. 34 and an extended or locked position shown in FIG. 33. Each lock element has a recess 144 cut into its underside to define a locking dog 146. The two dogs 146 are rotated into and out of the recess 68 in the last pallet to be loaded into the aircraft.

A bracket 148 having top and bottom walls 150 is slidably fitted within the housing 130 through an opening 152 in housing 130. Bracket 148 has an upper portion 154 at its forward end which includes a tubular portion 156 secured by screws 158 to a sequential control rod 160, the construction and operation of which will explained hereinafter. The bracket 148 is provided with a pair of cam slots 162 and 164 while housing 130 has slots 166 and 168 in its top and bottom walls. Lock element 134 has a slot 170 therein. A pin 172 extends through slots 162, 166 and 170 and a pin 174 extends through slots 164 and 168. The pins 172 and 174 and their respective slots insure that bracket 148 will slide freely within housing 130 and also prevents rotation of lock elements 134 and 136 by a force applied directly thereto. The movement of bracket 148 is controlled by movement of the sequential operating rod 160 either directly by axial movement of rod 160 imparted thereto at control station 40 or through a manual operating lever 176. The lever 176 is analogous in function to a foot pedal 94 and is pivotally mounted on rail 25 by a pin 178. A link 180 is pivoted at one end on the forward end of lever 187 and at its other end to the aft end of control rod 160. When lever 176 is raised rod 160 is shifted forwardly to retract lock elements 134 and 136, and when it is depressed rod 160 and bracket 148 are shifted aft to extend the lock elements 134 and 136. The control rod 160 is slidably supported on rail 25 by a series of tubular brackets 182 at spaced points along its length. As shown in FIG. 25, brackets 182 and rod 160 have flats 184 to prevent rotation of rod 160.

The control rod 160 extends throughout the length of the rail assembly and at each of the lock mechanisms 34 is provided with a flat 186 on its underside which cooperates with a roller 188 (see FIGS. 11 and 14) mounted on pin 83. As rod 160 is shifted rearwardly, either through control station 40 or by depression of lever 176, the cams at the forward ends of flats 186 will engage rollers 188 to pivot levers 82 to effect simultaneous locking of locks 34 if they have not already been locked through depression of the foot pedals in the manner described. When rod 160 is shifted forwardly assuming all locks 34 and 35 to be in locked condition, the aft ends of flats 186 successively engage rollers 188 to open all locks sequentially from aft to forward. The length and placement of the flats 186 controls the sequence in which the locks are released and the flats 186 are so placed as to insure that lock 35 will be opened first and then locks 34 opened sequentially from aft to fore as rod 160 is shifted forwardly. In effect, the length of flats 186 decreases progressively from fore to aft. As shown in FIGS. 21 and 23, rod 160 is provided with a notch 190 adapted to receive a roller 192 journaled on the upper end of a plunger 194 slidable within a hole 196 in rail 25 and urged upwardly by a spring 198. The notch 190 provides a detent for the position of rod 160 in which all lock mechanisms 34 and 35 are in locked condition.

The ti-down latch mechanisms 36 are provided for securing non-palletized cargo within the aircraft. Referring to FIGS. 9, 11 and 16 to 20, each latch mechanism 36 includes a support bracket 200 secured to rail 25 by bolts 202 and 204 and having a U-shaped portion 206. A latch element 208 is rotatably mounted within the bracket portion 206 by a pin 210 and a complementary latch element 212 is rotatable on a pin 214. Latch elements 208 and 212 have meshed gear teeth 216. A slide 218 is slidable within bracket portion 206 and has an upwardly extending arm 220 having a vertically elongated slot 222 receiving a pin 224 carried by a lever 226 pivoted on a pin 228.

A roller 230 journaled on lever 226 is adapted to engage a flat recess 236 formed on the underside of sequential operating rod 160.

Slide 218 is provided with slots 238 and 240. The housing has slots 242 and 244 while one end of latch element 208 has a slot 246. Pin 248 extends through slots 238, 242 and 246. A pin 250 carrying a roller 252 extends through slots 240 and 244. As rod 160 is shifted forwardly, roller 230 is engaged to pivot lever 226 which, through engagement of pin 224 in slot 222, pulls slide 218 forwardly. This movement of slide 218 shifts pin 248 to rotate latch element 208 to its open position, simultaneously causing latch element 212 to rotate to its open position. The motion of pin 250 along slots 240 and 244 lowers roller 252 to the position shown in FIG. 19. When roller 252 is in the position shown in FIG. 18 the engagement of shoulder 254 on latch element 212 with roller 252 provides a positive locked position of the latch elements 208 and 212. A spring 256 wrapped around pin 228 has one end 258 engaging lever 226 to bias the latter against pivotal movement in the forward direction. When the control rod 160 is shifted rearwardly, the lever 226 will pivot rearwardly and slide 218 will be shifted rearwardly to rotate latch elements 208 and 212 to the closed position.

The length and placement of the recesses 236 on control rod 160 determines the sequence in which the latch mechanisms 36 are operated, and are preferably chosen so that, when the rod is shifted rearwardly the latches 36 are closed sequentially from fore to aft, and when the rod is shifted forwardly the latches open sequentially from aft to fore.

As shown in FIG. 11, each latch device 36 is adapted when closed to secure one or more hooks 260 to the rail assembly. The hooks are secured on the end of tie-down straps 262 which may extend across to an oppositely disposed latch 36 or extend from each side of netting or the like which may be spread over the cargo to be contained. A tie-down ring 264 may be secured to the rail 25 by a bracket 266 at the aft end of the rail.

Figure 8:
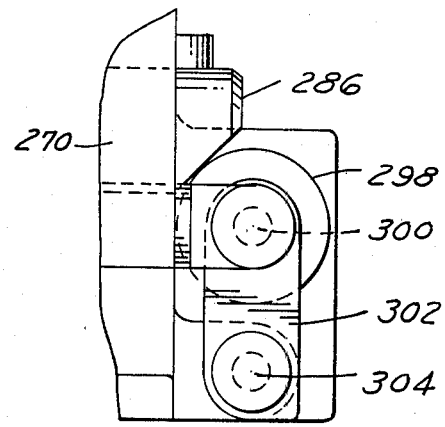
FIG. 8 is a side elevation taken online 8—8 of FIG. 6.
Figure 15:
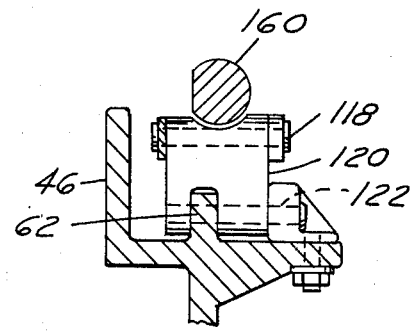
FIG. 15 is a sectional view taken on line 15—15 of FIG. 9.

The control station 40 at the forward end of each rail assembly includes separate operating mechanisms for the simultaneous operating rod 76 and the sequential operating rod 160 which are illustrated in FIGS. 4, 5, 6 and 8. The controls include a housing 270 mounted on the rail 25 and having a central portion 272 dividing the housing into a compartment 274 containing the operating mechanism for the simultaneous operating rod 76 and a compartment 276 containing operating mechanism for the sequential rod 160. A shaft 278 is supported in bearings 280 mounted in the partition 272 and the inner wall 282 of housing 270. A worm gear 284 is keyed to shaft 278 and meshes with a rack 286. An operating handle 288 is mounted on shaft 278 for swinging movement in a fore and aft direction. The handle contains a pawl device 290 on the end of rod 292 which extends upwardly through the handle 288 to an enlarged head 294. The pawl 290 cooperates with a ratchet indicated at 296 keyed to shaft 276 and worm gear 284. The heat 294 has a flat 296 thereon which serves as an indicator to enable the operator to selectively operate the handle 288 to shift the rod 76 in the desired direction. The directional control rod 292 may be inserted into handle 288 in either of two positions. In one such position, for example with flat 296 facing forwardly, swinging of handle 288 fore and aft will engage the pwal and ratchet mechanism in a manner to rotate worm gear 284 in a direction to shift rack 286, and control rod 76 to which the rack is connected, rearwardly in a step-by-step movement. When the position of indicating head 294 is turned 180° the pawl drives the ratchet in the opposite direction and the control rod 76 is shifted forwardly step by step. The forward end of rack 286 is beveled as shown in FIG. 8 to engage a roller 298 mounted on a pin 300 in a lever 302 which is pivoted on a pin 304 secured to housing 270. The details of the pawl and ratchet mechanism are not illustrated in detail since any suitable such mechanism to shift the rod 76 in a desired direction may be employed.

The control mechanisms for the sequential operating rod are essentially similar to that used for rod 76 and therefore will not be described in detail. Such controls include an operating handle 310 adapted to shift the control rod 160 through a ratchet drive step by step in a desired direction. However, the shaft 312 of this control has a gear 314 keyed thereto and disposed outwardly of housing 270. Gear 314 meshes with a gear 316 which is rotatable on a shaft 318 extending from housing 270. A stationary dial 320 supported on shaft 318 is suitably numbered so that a pointer 322 carried by gear 316 cooperates with dial 320 to indicate to the operator which of the lock mechanisms are locked.

The ramp 14 is provided with a guide rail 330 at each side thereof having vertical flanges 332 which support rollers 334 to comprise the conveyors 16. Each rail 330 includes a rearward section 336 which is connected to the main portion of the rail by hinge 338. The section 336 has a pair of rollers 334 and a latching device 340 mounted thereon. As shown in FIGS. 38 and 39, the rail section 336 may pivot outwardly a slight amount to facilitate loading of a pallet that might be misaligned with the conveyors 16 as the pallet is being loaded onto the aft end of the ramp 14. A spring 342 coiled around pin 344 biases latch member 346 downwardly over a pin 348 to retain the rail section 336 in position.

The aft end of ramp 14 is provided with two flippers 350 which are employed to load and unload vehicles onto the ramp. The flippers 350 are pivotally connected to the end of ramp 14 by an axle 352 which extends through hinge members 354 on ramp 14 and hinge members 356 on flippers 350. Each flipper 350 is automatically pivoted about its hinged connection to ramp 14 as the latter is raised and lowered by control linkages 358 extending along the outer side of the associated guide rail 330. Each linkage 358 comprises an arm 360 pivoted on a pin 362 carried by a bracket 364 on rail 25. Bracket 364 is carried on a pin 365 inserted into a hole in rail 25 and releasably retained by a spring arm 367 secured to rail 25. The other end of arm 360 is pivotally connected by pin 336 to one end of lever 368. Lever 368 is pivoted on guide rail 330 by a pin 370 and bracket 372. At its other end lever 368 is pivotally connected to one end of link 374 by pin 375. A lever 376 is pivotally mounted on a bracket 378 by a pin 380. Link 374 is connected by pin 382 to lever 376. A link 384 has a swivel connection with lever 376 by means of a ball 386 disposed within an aperture in lever 376 and a pin 388 extending through link 384 and ball 386. The other end of link 384 is swivelled by a ball 389 and a pin 390 to an arm 392 on the outer end of a rod 394. Rod 394 is slidably supported by a sleeve 396 on the end of ramp 14 and has a reduced diameter portion 398 slidable within the axle 352. A spring 400 within sleeve 396 reacts against a shoulder on rod 394 and a collar 402 on axle 352. The reduced portion 398 of rod 394 and the internal opening in axle 352 have a non-circular cross section as shown in FIG. 42. Hinge members 356 are secured to axle 352 so as to rotate therewith.

Figure 37:
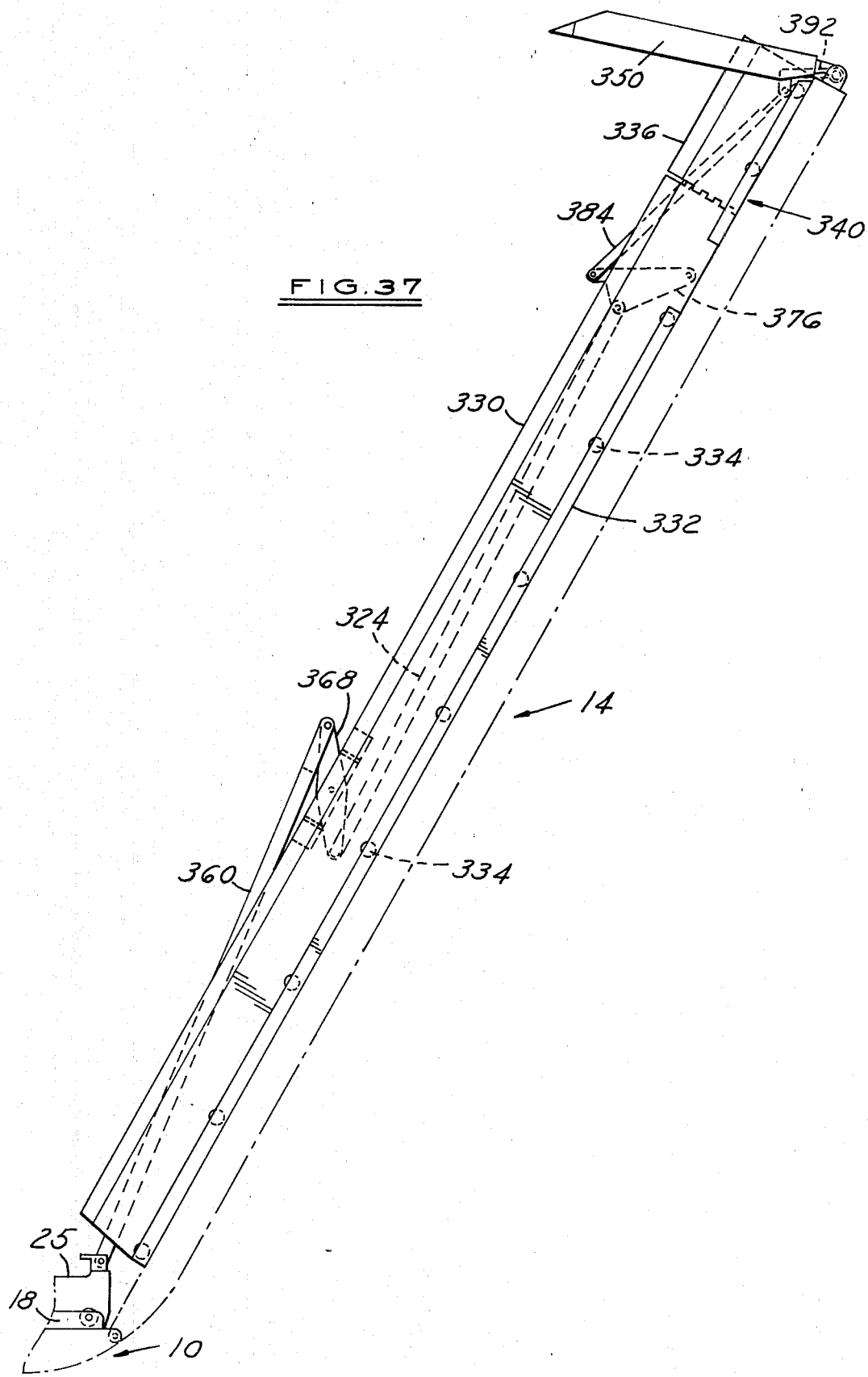
FIG. 37 is a side elevation similar to FIGS. 35 and 36 showing the flipper devices in their raised position.

A power strut 404 of a conventional type is operable to raise and lower ramp 14. The linkages 358 are operable to swing the flipper between extended position shown in FIGS. 35 and 36 when ramp 14 is lowered, and their retracted position shown in FIG. 37 when the ramp is raised. The link 384 is shown in FIG. 39 as being swung outwardly when the rail section is pivoted to accomodate some misalignment of a pallet during loading. The movement is permitted by the swivel mountings of link 384 with lever 376 and arm 392, and by the slidable telescoping connection of rod 394 within axle 352.

As shown in FIGS. 38 and 42, the flipper 350 has a rectangular box-like center section 406 formed on one side to support rollers 408 on pins 410 with the rollers 408 projecting slightly above the top surface 410 of the flipper. The center section is supported on a frame member 412 secured within the opening which receives the section 406. The latter is removable from the opening and may be inverted and replaced so that the surface 414 thereof is flush with the surface 410, and this position would normally be used when vehicles are loaded or unloaded. The rollers 408 may be placed as shown to facilitate the loading and unloading of other types of cargo.

Having thus described my invention, I claim:

1. Cargo handling apparatus for aircraft comprising a load restraining rail assembly having a series of lock mechanisms spaced along its length, each said lock mechanism having a load engaging locking element and an operating means individual thereto and operable by a crew member at said lock mechanism to move said locking element to locked position, and linkage means interconnecting the said operating means for said locking elements in such manner that actuation of any intermediate one of such operating means is operable to actuate all other said operating means located along the rail assembly from said one operating means.

2. Cargo handling apparatus according to claim 1 wherein said operating means includes a foot pedal operable upon depression thereof to move said locking element to locked position.

3. Cargo handling apparatus according to claim 1 including a control rod extending along said rail assembly and operably connected to each of said lock mechanisms, means for shifting said control rod axially in opposite directions, movement of said control rod in one direction being operable to move all of said lock mechanisms simultaneously to locked position, movement of said control rod in the opposite direction being operable to move said lock mechanisms sequentially to unlocked position.

4. Cargo handling apparatus according to claim 3 wherein said means for shifting said control rod includes a pawl and ratchet means for shifting said control rod in a step by step movement in said opposite direction.

5. Cargo handling apparatus according to claim 1 in which each intermediate lock operating means is prevented from operating its associated locking element to locked position if any lock mechanism forwardly thereof is prevented from moving its locking element into locked position.

6. Cargo handling apparatus for aircraft comprising a load restraining rail assembly extending longitudinally of the aircraft and having a series of lock mechanisms spaced along its length, each of said lock mechanisms having a movable load engaging locking element and an operating means individual thereto and operable by a crew member at said lock mechanism to move said locking element to locked position, said operating means at each lock mechanism comprising means movable longitudinally of said aircraft in one direction as said locking element moves into locking position, and movable in the opposite direction as said locking element moves from locked to unlocked position, and lost motion connection between adjacent means effective to provide simultaneous unlocking of said lock mechanism.

7. Cargo handling apparatus according to claim 5 wherein said rail assembly includes a series of tie-down latch mechanisms spaced along its length, a control rod extending along the length of said rail assembly, means operatively connecting said control rod and all of said latch mechanisms and other means operatively connecting said control rod and all of said lock mechanisms, whereby movement of said control rod in one direction is operable to move all of said locking members to locked position simultaneously and to move all of said latch mechanisms to closed position sequentially.

8. Cargo handling apparatus according to claim 7 wherein said control rod is operable upon movement thereof in the opposite direction to effect movement of all of locking members to unlocked position and effect movement of all of said latch mechanisms to open position sequentially from one end of said rail assembly to the other.

9. Cargo handling apparatus according to claim 8 including control means for said control rod for effecting movement thereof in opposite directions.

10. Cargo handling apparatus according to claim 9 wherein said control means includes a pawl and ratchet drive means to shift said control rod in a step by step movement.

11. Cargo handling apparatus according to claim 6, comprising a remote control actuator connected to said means included in the foremost lock mechanism in the aircraft, said lost motion connections being operable to shift the locking elements of all locked mechanisms which are in locked position simultaneously to unlocked position as the locking element at said foremost lock mechanism is moved to unlocked position.

12. Cargo handling apparatus according to claim 11, in which the means at each lock mechanism movable longitudinally of the aircraft on movement of said lock element comprises a lever, and a linkage means connecting each lever to the associated locking element.

13. Cargo handling apparatus according to claim 12, comprising a continuous rigid control rod, movable longitudinally of said rail, means for moving said rod incrementally, spaced cam surfaces on said rod engageable sequentially with said levers and operable to shift said levers sequentially to move the associated locking elements sequentially to unlocked position.

14. Cargo handling apparatus according to claim 6, in which the means movable longitudinally of the aircraft comprises aligned rod segments extending between adjacent lock mechanism, levers fixed to the rail at opposite ends of each lock mechanism, links connected between the levers at opposite ends of said lock mechanisms, lost motion connections between one end of each link and the lever to which it is connected.

15. In cargo handling apparatus for an aircraft having a cargo space and a pivoted loading ramp normally closing one end of the cargo space and adapted to be swung to a lowered, inclined loading and unloading postion providing access to said cargo space, the improvement comprising a flipper hingedly mounted on the free end of the aircraft loading ramp, linkage means mounted on said loading ramp, said linkage means including a first link having one end pivotally connected to said flipper on an axis parallel to an offset from the hinge axis of said flipper, a second link having one end pivotally connected to the aircraft body, said linkage means further including means interconnecting the other ends of said first and second links in such manner that swinging of the ramp to its lowered position effects pivoting of said flipper to an extended position in which its upper surface forms a continuation of the ramp surface and its free end engages the ground, said interconnecting means being operable when the ramp is raised to closed position to effect pivoting of said flipper to a retracted position so as to be located inside the cargo space when the ramp is fully closed.

16. Cargo handling apparatus according to claim 15 wherein said interconnecting means includes a bell crank lever pivotally mounted on said ramp and having its arm positions respectively connected to said other ends of said first and second links.

17. Cargo handling apparatus according to claim 15 wherein said hinged connection between said ramp and flipper includes a tubular hinge member rigidly secured to said flipper and rotatably mounted on the end of said ramp, a rod axially slidably and non-rotatably supported within said hinge member, an arm on the outer end of said rod, said one ends of said first link being pivotally connected to said arm.

18. Cargo handling according to claim 17 wherein said first link has a ball joint connection with said arm and with said interconnecting means to permit lateral swinging movement of said first link and axial sliding of said rod while said flipper remains stationary.

19. Cargo handling apparatus according to claim 18 including roller conveyor means mounted on said ramp, said conveyor means having an outer end section pivotably connected thereto for lateral swiging movement to accommodate misalignment of cargo being loaded with the main portion of said 20. In aircraft cargo handling apparatus including load restraining rail assemblies between which load supporting pallets are adapted to travel; a lock mechanism for restraining a pallet against longitudinal movement comprising a housing secured to a rail assembly, a pair of locking members rotatably mounted in said housing for rotation in a horizontal plane, said locking members having meshed gear teeth thereon for simultaneous rotation of said locking members into and out of said housing, said locking members having portions thereof engageable with said pallet when said locking members are projected out of said housing, and means engageable with one of said locking members to rotate the latter between locked and unlocked positions thereof.

21. A lock mechanism according to claim 20 including an actuating member slidable within said housing, and cam means interconnecting said actuating member and one of said locking members to rotate said locking members between said positions upon sliding movement of said actuating member.

22. A lock mechanism according to claim 21 wherein said cam means is operable to prevent rotation of said locking members out of their locked position by a force applied directly to a locking member.

23. Cargo handling apparatus for an aircraft having an elongated cargo space extending fore and aft of the aircraft and an opening toward the after end of the aircraft through which loads are moved, the cargo space having a plurality of lock mechanisms spaced longitudinally thereof, each mechanism having a load engaging locking element and operating means individual thereto and operable by a crew member at said mechanism to move the locking element thereat to locked position, linkage means connecting the adjacent lock mechanisms operable upon actuation of the operating means of any mechanism except the forwardmost thereof to actuate the operating means of all lock mechanisms forwardly thereof.

24. Cargo handling apparatus as defined in claim 23, in which the linkage means comprises rigid rod sections extending between adjacent lock mechanisms and longitudinally spaced alligned rigid lost-motion links connecting the adjacent ends of adjacent rod sections.

25. Cargo handling apparatus as defined in claim 23, which comprises a sequential control rod movable in one direction to sequentially unlock said locks from the aftermost to the foremost.

26. Cargo handling apparatus as defined in claim 19, in which the linkage means is movable in one direction to simultaneously unlock all of said locks.

* * * * *